United States Patent

Deffler

(10) Patent No.: US 8,706,744 B2
(45) Date of Patent: Apr. 22, 2014

(54) DETERMINING DEPENDENCIES DURING MACRO EXPANSION

(75) Inventor: Tad A. Deffler, Boonton, NJ (US)

(73) Assignee: CA, Inc., Islandia, NY (US)

( * ) Notice: Subject to any disclaimer, the term of this patent is extended or adjusted under 35 U.S.C. 154(b) by 79 days.

(21) Appl. No.: 13/118,778

(22) Filed: May 31, 2011

(65) Prior Publication Data

US 2012/0310957 A1    Dec. 6, 2012

(51) Int. Cl.
*G06F 17/30*    (2006.01)

(52) U.S. Cl.
USPC .......................................................... 707/755

(58) Field of Classification Search
None
See application file for complete search history.

(56) References Cited

U.S. PATENT DOCUMENTS

| | | | |
|---|---|---|---|
| 5,603,021 A * | 2/1997 | Spencer et al. | 1/1 |
| 6,105,043 A * | 8/2000 | Francisco et al. | 715/234 |
| 7,571,431 B2 * | 8/2009 | Hampapuram et al. | 717/141 |
| 7,711,685 B1 * | 5/2010 | Deffler et al. | 707/708 |
| 2008/0126326 A1 * | 5/2008 | Potter et al. | 707/4 |

* cited by examiner

*Primary Examiner* — Rehana Perveen
*Assistant Examiner* — Hung Havan
(74) *Attorney, Agent, or Firm* — Baker Botts, LLP

(57) ABSTRACT

In certain embodiments, a parser parses a formula to yield one or more functions, at least one function comprising a dependent value of a dependent object. One or more macro handlers configured to execute the functions are determined. At least one macro handler is instructed to register with one or more dominant objects on behalf of the dependent object, where the dominant objects are used to evaluate the dependent value.

13 Claims, 2 Drawing Sheets

US 8,706,744 B2

DETERMINING DEPENDENCIES DURING MACRO EXPANSION

TECHNICAL FIELD

This invention relates generally to the field of computing technology and more specifically to determining dependencies during macro expansion.

BACKGROUND

A modeling product may model a system. The modeling product may use objects to store information about the system. Macro expansion language may be used to calculate the value of an object based on values of one or more other objects. If calculated values are not stored in the model, the values may be calculated as needed.

SUMMARY OF THE DISCLOSURE

In accordance with the present invention, disadvantages and problems associated with previous techniques for determining dependencies may be reduced or eliminated.

In certain embodiments, a parser parses a formula to yield one or more functions, at least one function comprising a dependent value of a dependent object. One or more macro handlers configured to execute the functions are determined. At least one macro handler is instructed to register with one or more dominant objects on behalf of the dependent object, where the dominant objects are used to evaluate the dependent value.

Certain embodiments of the invention may provide one or more technical advantages. A technical advantage of one embodiment may be that a parser can instruct a macro handler to register with one or more dominant objects on behalf of a dependent object. The registration allows a dominant object to notify the dependent object of a change in the dominant object.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

A modeling product may model a system. The modeling product may use objects to store information about the system. In certain situations, a dependent value of a dependent object may depend on one or more dominant values of one or more dominant objects. For example, the dominant values may be needed to calculate the dependent value. Accordingly, a change in a dominant value may yield a change in a dependent value.

Certain known techniques may be used to notify dependent objects of a change in a dominant value. According to certain known techniques, a dependent object may register with a dominant object to receive a notification of changes. In these techniques, the dependent object needs to identify the dominant objects in order to register with them. The dependent object may examine formulas that it has to identify the dominant objects. To examine formulas, the dependent object typically has to perform the operations of a parser and a macro handler. This, however, entails that one object duplicates the operations another object, which breaks encapsulation.

According to other known techniques, heuristic rules derived from real world patterns of dependencies are used to write notification operations for a computer program. For example, a change in a name of a table often changes the names of the columns of the table, so code may be written that instructs a table object to notify a column object of table name changes. The heuristic rules, however, may not capture all dependencies of a computer program. Moreover, the heuristic rules may include dependencies that are not present in the computer program.

Figure 1:
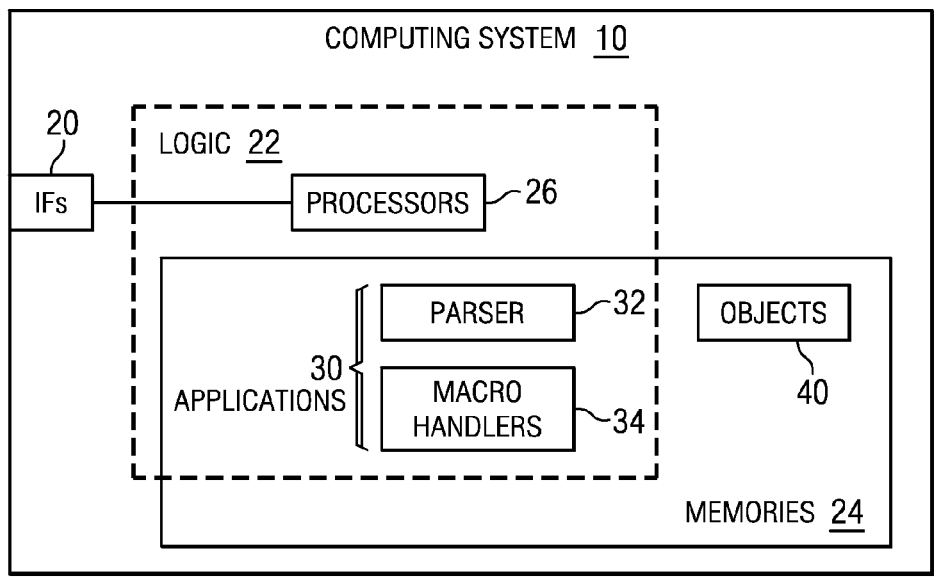
FIG. 1 illustrates an example of a system that may be used to determine dependencies during macro expansion.

FIG. 1 illustrates an example of a system 10 that may be used to determine dependencies during macro expansion. In certain embodiments, system 10 may include a parser that can instruct a macro handler to register with one or more dominant objects on behalf of a dependent object. The registration allows a dominant object to notify the dependent object of a change in the dominant object.

In the illustrated example, system 10 includes one or more interfaces (IFs) 20, logic 22, and one or more memories 24. Logic 22 includes one or more processors 26 and applications 30, such as a parser 32 and one or more macro handlers 34. Memories 24 store applications 30 and one or more objects 40.

Parser 32 parses the source code of a computer program language to create an internal representation of the code. In certain embodiments, parser 32 parses a formula to yield one or more functions and determines one or more macro handlers 34 configured to execute the functions. Parser 32 instructs the macro handlers 34 to register with one or more dominant objects on behalf of one or more dependent objects.

Parser 32 may update the registrations when a next formula (such as an updated formula or a new formula) is received. For example, parser 32 parses the next formula to yield a next function. Parser 32 determines a next macro handler 34 configured to execute the next function and instructs the next macro handler 34 to register with a next dominant object on behalf of a next dependent object. The next dominant object may be used to evaluate the next dependent object. Parser 32 may also instruct a macro handler 34 to remove the registrations of dominant objects of outdated formulas.

Macro handler 34 executes functions. For example, a macro handler 34 may obtain input for a function and then apply operators to the input. In certain situations, the input may include dominant values from dominant objects. Any suitable macro handler may be used, for example, a macro handler as described in U.S. Pat. No. 7,711,685 "Method and System for an Extensible Macro Language", which is incorporated herein by reference.

In certain embodiments, a macro handler 34 receives a register instruction to register a dominant object of a formula on behalf of a dependent object. Macro handler identifies the dominant object of the formula and registers with the dominant object on behalf of the dependent object to allow the dominant object to notify the dependent object of a change in the dominant object.

Figure 2:
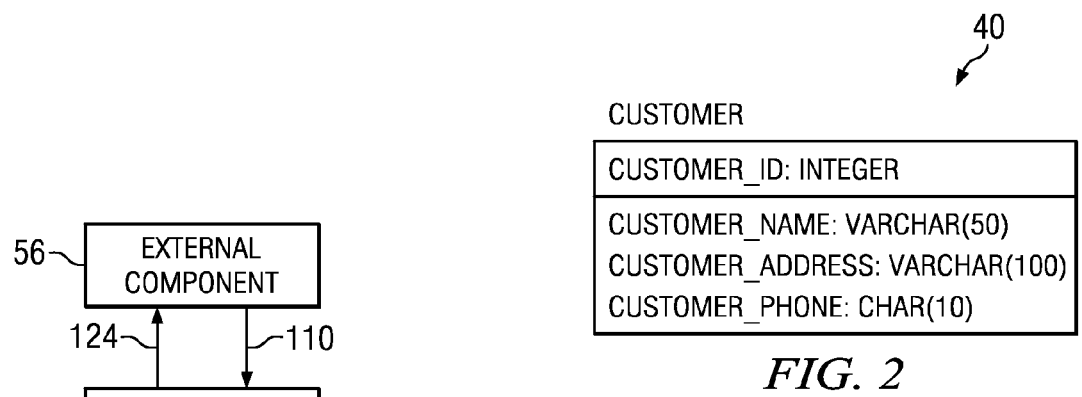
FIG. 2 illustrates an example of a representation of a sample table.
Figure 3:
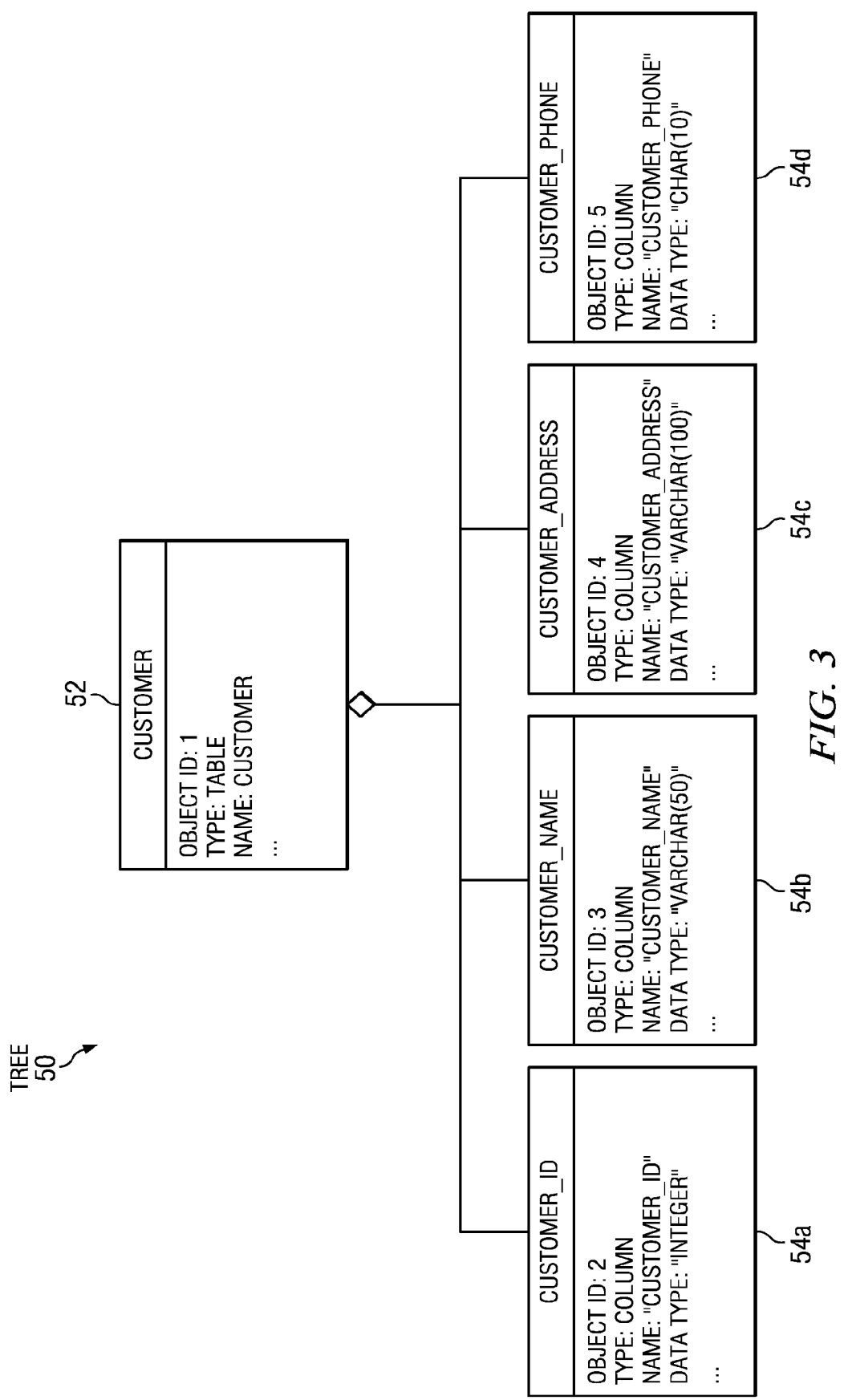
FIG. 3 illustrates an example of a tree of the objects of the table of FIG. 2.

FIG. 2 illustrates an example of a representation of a sample table 40, and FIG. 3 illustrates an example of a tree 50 of objects of table 40. In the example, object tree 50 includes a dominant object 52 and one or more dependent objects 54 (54a-d). A dependent object 54 depends on a dominant object 52. In certain embodiments, the value of a dependant object may depend on one or more values of one or more dominant objects. In the embodiments, the formula for calculating the dependent value may use dominant values as input. For example, the formula may include a function that indicates a dominant value to be used as input and that may be used to obtain the dominant value. The formula may also include operators and strings that may be used to calculate the dependent value.

In the illustrated example, the dominant object 52 is the table, and the dependent objects 54 (54a-d) are columns of the table. The names of the dependent objects depend on the name of the dominant object 52. The formulas for calculating the column names have the format: TableName( )+string, where TableName( ) is a function that may be used to obtain the table name, + is an operator for concatenation, and string is "_ID" for column name 54a, "_NAME" for column name 54b, "_ADDRESS" for column name 54c, and "_PHONE" for column name 54d. In the example, the table name is CUSTOMER, so the column names are CUSTOMER_ID, CUSTOMER_NAME, CUSTOMER_ADDRESS, and CUSTOMER_PHONE.

Figure 4:
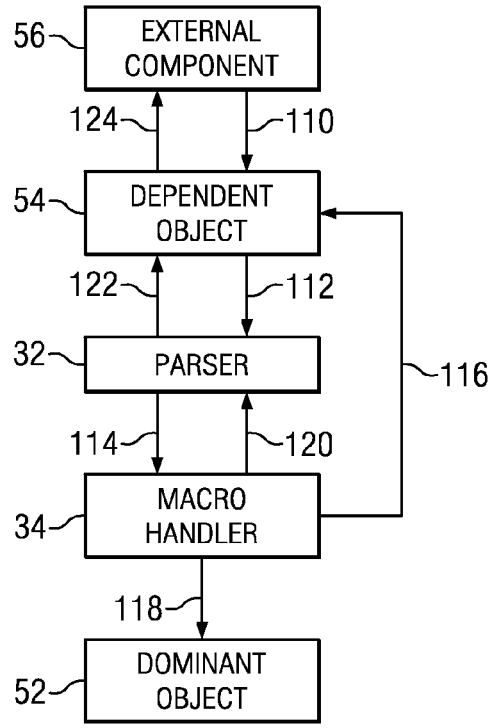
FIG. 4 illustrates an example of a method for calculating a dependent value.

FIG. 4 illustrates an example of a method for calculating a dependent value. In the example, an external component 56 requests a dependent value from dependent object 54 at step 110. External component 56 may be a component that is separate from applications 30, and may be an interface 20, such as a display. The dependent object sends the formula for the dependent value to parser 32 at step 112. Parser 32 detects a function and selects the appropriate macro handler 34 to execute the function at step 114. Macro handler 34 determines that dominant values are needed and then requests that the dependent object provides the dominant object at step 116.

Macro handler 32 asks the dominant object 52 for its dominant value at step 118. Macro handler 34 then returns the dominant value to parser 32 at step 120. Parser inserts the dominant value into the formula and returns the dependent value to dependent object 54 at step 122. Dependent object 54 returns the dependent value to external component 56 at step 110, and the method terminates.

In certain situations, dependent object 54 may notify external component 56 of changes in a dependent value. A change in a dominant value may change a dependent value, so dependent object 54 may be notified of dominant value changes in order to notify external component 56 of changes in a dependent value. An example of a method for notifying dependent object 54 is described with reference to FIG. 5.

Figure 5:
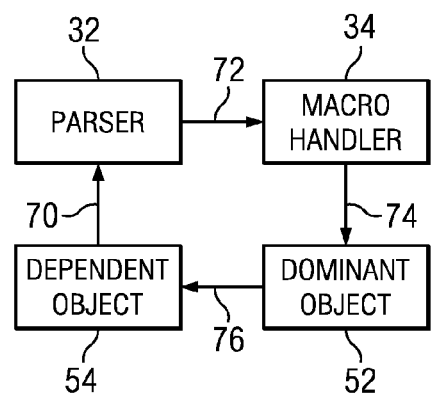
FIG. 5 illustrates an example of a method for determining dependencies during macro expansion.

FIG. 5 illustrates an example of a method for determining dependencies during macro expansion. In the example, when a formula is placed into an object, notification operations are set up. A notification operation instructs a dominant object to notify dependent objects of changes in dominant values.

In the example, dependent object 54 requests that parser 32 parses a formula at step 70 and provides parser 32 with the address of dependent object 54. Parser 32 requests that macro handlers 34 execute functions of the formula at step 72. Macro handler 34 registers with dominant objects 52 on behalf of dependent objects 54 for dependencies of the functions at step 74. The registration instructs dominant objects 52 to send notification of any changes in dominant values to the dependent object 54's address. Dominant object 52 notifies dependent object 54 of changes in dominant values at step 76. Dependent object 54 may then notify an external component of the changes.

If the formula is changed, the dependencies may be updated in the following manner. Parser 32 evaluates the old formula and instructs macro handlers 34 to remove registrations associated with the old formula. Parser 32 evaluates the new formula and instructs macro handlers 34 to add registrations for the new formula.

In certain embodiments, the method may resolve difficulties of breaking encapsulation and/or runtime extensibility. Parser 32 performs a parsing operations, and macro handlers 34 execute the functions, so encapsulation is maintained. In addition, new functions can still perform registrations with the address of the dependent object, so no new navigation algorithms are required.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. For example, the operations of parser 32 and macro handler 34 may be performed by one component, or the operations of parser 32 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

In certain embodiments, an entity that performs a first step that precedes (such as leads to) a second step may be regarded as facilitating the second step. For example, if an entity performs step A that precedes step B, the entity also facilitates step B. In certain embodiments, a first entity that performs a first step that precedes a second step that may be performed by a second entity may be regarded as allowing the second entity to perform the second step. For example, if a first entity performs step A that precedes step B that may be performed by a second entity, the first entity also allows the second entity to perform step B.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
    in response to receiving, by a dependent object, a request for a dependent value calculated using a formula that yields one or more functions, sending the formula for the dependent value from the dependent object to the parser;
    parsing, by the parser using one or more processors, the formula to yield the one or more functions, at least one function comprising a dependent value of the dependent object;
    determining one or more macro handlers configured to execute the one or more functions; and
    in response to determining the one or more macro handlers, instructing at least one macro handler of the one or more macro handlers to identify one or more dominant objects comprising input for the one or more functions and register with the one or more dominant objects on behalf of the dependent object, the one or more dominant objects used to evaluate the dependent value, wherein registering the dependent object with the one or more dominant objects sets up a notification operation instructing the one or more dominant objects to notify the dependent object of a change in one or more dominant values of the one or more dominant objects.

2. The method of claim 1, further comprising:
    receiving a next formula; and
    instructing the one or more macro handlers to remove the registrations with the one or more dominant objects.

3. The method of claim 1, further comprising:
    parsing a next formula to yield one or more next functions, at least one next function comprising a next dependent value of a next dependent object;
    determining one or more next macro handlers configured to execute the one or more next functions; and
    instructing at least one macro handler to register with one or more next dominant objects on behalf of the next dominant object.

4. The method of claim 1, further comprising:
    receiving the formula from the dependent object.

5. One or more non-transitory computer readable media storing code, when executed by one or more processors, configured to:
    in response to receiving, by a dependent object, a request for a dependent value calculated using a formula that yields one or more functions, send the formula for the dependent value from the dependent object to the parser;
    parse the formula to yield the one or more functions, at least one function comprising a dependent value of the dependent object;
    determine one or more macro handlers configured to execute the one or more functions; and
    in response to determining the one or more macro handlers, instruct at least one macro handler of the one or more macro handlers to identify one or more dominant objects comprising input for the one or more functions and register with the one or more dominant objects on behalf of the dependent object, the one or more dominant objects used to evaluate the dependent value, wherein registering the dependent object with the one or more dominant objects sets up a notification operation instructing the one or more dominant objects to notify the dependent object of a change in one or more dominant values of the one or more dominant objects.

6. The media of claim 5, the code configured to:
    receive a next formula; and
    instruct the one or more macro handlers to remove the registrations with the one or more dominant objects.

7. The media of claim 5, the code configured to:
    parse a next formula to yield one or more next functions, at least one next function comprising a next dependent value of a next dependent object;
    determine one or more next macro handlers configured to execute the one or more next functions; and
    instruct at least one macro handler to register with one or more next dominant objects on behalf of the next dominant object.

8. The media of claim 5, the code configured to:
    receive the formula from the dependent object.

9. An apparatus comprising:
    one or more memories configured to store a formula; and
    one or more processors configured to:
        in response to receiving, by a dependent object, a request for a dependent value calculated using a formula that yields one or more functions, send the formula for the dependent value from the dependent object to the parser;
        parse the formula to yield the one or more functions, at least one function comprising a dependent value of the dependent object;
        determine one or more macro handlers configured to execute the one or more functions; and
        in response to determining the one or more macro handlers, instruct at least one macro handler of the one or more macro handlers to identify one or more dominant objects comprising input for the one or more functions and register with the one or more dominant objects on behalf of the dependent object, the one or more dominant objects used to evaluate the dependent value, wherein registering the dependent object with the one or more dominant objects sets up a notification operation instructing the one or more dominant objects to notify the dependent object of a change in one or more dominant values of the one or more dominant objects.

10. The apparatus of claim 9, the one or more processors configured to:
   receive a next formula; and
   instruct the one or more macro handlers to remove the registrations with the one or more dominant objects.

11. The apparatus of claim 9, the one or more processors configured to:
   parse a next formula to yield one or more next functions, at least one next function comprising a next dependent value of a next dependent object;
   determine one or more next macro handlers configured to execute the one or more next functions; and
   instruct at least one macro handler to register with one or more next dominant objects on behalf of the next dominant object.

12. The apparatus of claim 9, the one or more processors configured to:
   receive the formula from the dependent object.

13. The method of claim 1, further comprising:
   receiving an instruction to remove the registration, the instruction sent in response to a next formula; and
   removing the registration.

* * * * *